United States Patent
Sanders

(10) Patent No.: US 6,434,528 B1
(45) Date of Patent: Aug. 13, 2002

(54) COMPUTER NETWORK TELEPHONY

(75) Inventor: Jeremy Guy Sanders, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/451,061

(22) Filed: Nov. 30, 1999

(30) Foreign Application Priority Data

Mar. 31, 1999 (GB) ............................................. 9907319

(51) Int. Cl.[7] .......................... G10L 21/06; G10L 11/02; G10L 15/04; H04Q 9/02; H04M 5/00
(52) U.S. Cl. .................... 704/275; 704/270; 704/270.1; 704/251; 379/273; 379/142.01; 379/142.07; 379/902; 455/445; 370/351
(58) Field of Search ................................ 704/270, 250, 704/275, 270.1

(56) References Cited

U.S. PATENT DOCUMENTS

| | | | | |
|---|---|---|---|---|
| 5,884,262 A | * | 3/1999 | Wise et al. ............... | 704/270.1 |
| 5,916,302 A | * | 6/1999 | Dunn et al. .............. | 704/270.1 |
| 6,167,376 A | * | 12/2000 | Ditzik ....................... | 704/270 |
| 6,226,361 B1 | * | 5/2001 | Koyama ..................... | 704/270 |
| 6,240,391 B1 | * | 5/2001 | Ball et al. ................. | 704/270.1 |
| 6,241,612 B1 | * | 6/2001 | Heredia ...................... | 704/270 |

FOREIGN PATENT DOCUMENTS

| | | | | |
|---|---|---|---|---|
| GB | 2317782 | 1/1998 | ............ | H04M/3/42 |
| GB | 2328114 | 10/1999 | ............ | H04M/3/42 |
| GB | 2331197 | 12/1999 | ............ | H04M/3/00 |
| JP | 1051453 | 7/1996 | ............ | H04L/12/28 |
| JP | 10271117 | 3/1997 | ............ | H04L/12/28 |
| JP | 11017796 | 6/1997 | ............ | H04M/1/27 |
| JP | 10112757 | 9/1997 | ............ | H04M/3/42 |
| JP | 10145397 | 9/1997 | ............ | H04L/12/28 |
| JP | 11075228 | 9/1997 | ............ | H04Q/3/58 |

OTHER PUBLICATIONS

"Dial 1–800 –Internet", Byte magazine, Feb. 1996, pp. 83–88.
"Nattering On", New Scientist, Mar. 2, 1996, pp. 38–40.
"Using Local Area Networks for Carrying Online Voice" by D Cohen, pp. 13–21, Local Computer Networks (edited by P Ravasio, G Hopkins, and N Naffah, North Holland, 1982).
"Voice Transmission over an Ethernet Backbone" by P Ravasio, R Marcogliese and R Novarese, pp. 39–65, Computer Networks (edited by P Ravasio, G Hopkins, and N Naffah, North Holland, 1982).

* cited by examiner

Primary Examiner—Richemond Dorvil
Assistant Examiner—Daniel Nolan
(74) Attorney, Agent, or Firm—Jerry W. Herndon

(57) ABSTRACT

There is provided method and apparatus for connecting computer network ip telephones using a speech recognition engine and a ip address database on an INTERNET server, The method comprises opening a voice channel from an ip phones to a speech recognition server; determining the name of the addressee from a speech input sent over the voice channel to the speech recognition server by the caller; determining an ip address from an ip address database corresponding to the determined addressee's name; opening a data channel from the database and transmitting the ip address to one or other of said telephones; and routing logic on said one or other ip phones using the ip address to establish a connection with the other ip phone. This allows the ip phones to access remote resources of speech recognition and a large database thereby taking advantage of more powerful resources that would be available locally.

7 Claims, 2 Drawing Sheets

COMPUTER NETWORK TELEPHONY

FIELD OF THE INVENTION

This invention relates to computer network telephony, In particular it relates to making connections between network telephones on a computer network.

BACKGROUND OF INVENTION

Although originally intended for the transmission of computer data, more recently computer networks and specifically the INTERNET has been exploited to provide real time telephony communications. The primary attraction of the INTERNET for telephony communications is the low charge compared with conventional telephony or the plain old telephone system (POTS). Many INTERNET users have a dial-up connection to an access provider over a local telephone line, and therefore such users pay only local telephone charges when logged on. Some access providers charge a monthly description, whilst others charge on the basis of connection time (some may do both). However, there is generally no charge associated with actual data transfer over the network. As a result, the effective cost of an international call over the INTERNET may be no more than that of a local call of the same duration to the access provider. In addition, the fully digital nature of the INTERNET may potentially offer a richer functionality (e.g. in terms of conference calling) than conventional telephone networks. INTERNET phones are surveyed in the article "Dial 1-800-Internet" in Byte Magazine, February 1996, pages 83–88 and in the article "Nattering On", in New Scientist, Mar. 2, 1996, pages 38–40.

The transmission of voice signals over a packet network is described for example in "Using Local Area Networks for Carrying Online Voice" by D. Cohen, pages 13–21, in "Voice Transmission over an Ethernet Backbone" by P. Ravasio, R. Marcogliese, and R. Novarese, pages 39–66, both in "Local Computer Networks" (edited by P. Ravasio, G. Hopkins, and N. Naffah; North Holland, 1982) and also in GB 2283252. The basic principles of such a scheme are that a first computer digitally samples a voice input signal at a regular rate (e.g. 8 kHz). A number of samples are then assembled into a data packet for transmission over the network to a second terminal, which then feeds the samples to a loudspeaker or equivalent device for play out, again at a constant 8 kHz rate. Voice transmission over the INTERNET is substantially similar to transmission over a LAN (which may indeed provide part of the INTERNET transmission path), but there tends to be less spare bandwidth available on the INTERNET. As a result, INTERNET phones normally compress the voice signal at the transmitting end, and then decompress it at the receiving end.

Voice directories for POTS are known. WILDFIRET-MAdvanced Voice-Controlled Electronic Assistant has various capabilities, including acting as a "voice dialer"— wherein the user can speak a telephone number they wish to call into a phone which has a connection to the WILD-FIRE™ system—the WILDFIRE™ system can perform a transfer to the telephone number requested. Users can also set up to 150 "nicknames" for commonly used numbers such as "work", "home", "bill", etc. and just ask the WILD-FIRE™ system to "call Bill", for example. The WILD-FIRE™ system is not an IP (INTERNET Protocol) telephony based product and does not allow for very large numbers of names in a directory. Furthermore it is an internal company directory which uses a private branch switch to make connections.

Another POTS voice directory, VIAVOICE™ Directory Dialer, prompts callers for a person's name, requests further information when duplicate names are encountered and transfers the call to the number which equates with that person's name. It currently has support for up to 250,000 names. It is not an IP telephony based product and uses a private branch switch based in the company or internal telephone network.

An ip address is a unique identification and uses several bytes of memory, more memory to store than a nickname or abbreviated address. This can cause a problem with thin devices with reduced memory capacity. This problem will become more prominent as the number of telephony addresses in the world rises at the current rate. Furthermore in a few years time the number of unique address will be reaching a limit and a new unique format may have to be used using far more numbers and memory. This is not such a problem for POTS telephones which may use local telephone numbers or extensions to request connections from switches.

INTERNET telephony uses a transient network of computers to send discrete packets of data between destinations. Unlike POTS telephones, the route the voice data take may vary over the course of a conversation, it is necessary that the network phones themselves have the full address information of the destination available.

DISCLOSURE OF THE INVENTION

According to one aspect of the invention there is provided a method of connecting computer network ip telephones: opening a voice channel from one of said ip phones to a speech recognition server; determining a name from a speech input sent over the voice channel to the speech recognition server; determining an ip address from an ip address database corresponding to the determined name; opening a data channel from the database and transmitting the ip address to one or other of said telephones; and routing logic on said one or other ip phones using the ip address to establish a connection with the other ip phone.

This allows the ip phones to access remote resources of speech recognition and a large database thereby taking advantage of more powerful resources than would be available locally. This is particularly advantageous for pervasive computing devices which have limited resources.

The network phone differs from a normal phone in the following manner: it only has a single multipurpose button, has no numeric identification on it, and plugs into a data network rather than a telephone line connected to a switch. It may be a virtual device on a screen rather than an actual physical device. The device has the capability to set up a voice stream ("telephone call") to another similar device (virtual or physical) on the same data network. The device receives the address (not number) of the other device from a directory dialer, to which it will set up a connection whenever the single multipurpose button is pressed, so that the caller can declare the name (not number) of the person to whom a call is required and the directory dialer can supply the address to which a connection is to be made. Hence the addressing logic resides in the directory dialer, but the "switching logic" lies in the phone itself, which is to say that whereas a telephone connected to a switch always makes a connection through the switch, the Numberless LAN phone only makes a connection of its own initiative through the data network. This is already achieved by INTERNET phones (e.g., COOLTALK™ INTERNET PHONE for NETSCAPE™). The product may make calls to devices (phones, INTERNET phones, other Numberless LAN phones) outside of the network in which it is able to make connections of its own initiative by using the directory dialer as a gateway—however this ability is unlikely to effectively differentiate the product, as it is really a property of the directory dialer/gateway.

Advantageously the voice channel to the speech recognition server is opened immediately on activation of the said one ip phone. This can be achieved when the phone is taken of the hook. An ip socket is opened through the voice over ip interface to the remote speech recognition server. Since no buttons need be pressed by a caller all buttons may be removed from the phone interface increasing the ease of use and lowering manufacturing costs.

The speech recognition server may send a voice message requesting the name of the other ip phone or user be spoken into the ip phone. The caller responds and the spoken name transmitted to the speech recognition functionality on the remote server.

According to another aspect of the invention there is provided a computer network telephone comprising:

speech recognition functionality; a network address database functionality; and a routing module; wherein the speech recognition functionality will determine a name from a spoken name, an ip address will be determined from the database using the name, and the routing logic module will use the ip address to establish a connection with another network telephone.

Preferably the routing logic module is an integral part of the network telephone and allows the ip phone to route calls directly to other ip phones give their ip address.

The speech recognition engine may be provided in a remote server and also the ip address database maybe provided in a remote server. More preferably the ip address database and the speech recognition functionality are provided in the same remote server so that there is minimum communication time between the two functions.

According to a further aspect of the invention there is provided a network server comprising: a speech recognition engine; an Internet telephony database; a network interface; and a routing module; wherein the speech recognition engine is adapted to perform recognition on a spoken name corresponding to a second network phone, said spoken name is received through the network interface from a first network telephone; an ip address corresponding to the recognised name is located in the INTERNET telephony database and sent back to the first network phone through the routing module so that a connection may be established between the first and second network phones.

The intention of the at least the embodiment of the invention is to facilitate the elimination of long telephone numbers, diverse and inflexible numbering plans, and potentially telephone switches themselves. Furthermore is it hoped that telephones with numbered dialpads will eventually be replaced by telephones without a dialpad.

BRIEF DESCRIPTION OF THE DRAWINGS

In order to promote a fuller understanding of this and other aspects of the present invention, an embodiment will now be described, by way of example only, with reference to the accompanying drawings in which.

DETAILED DESCRIPTION OF THE PREFERRED EMBODIMENTS

Figure 1:
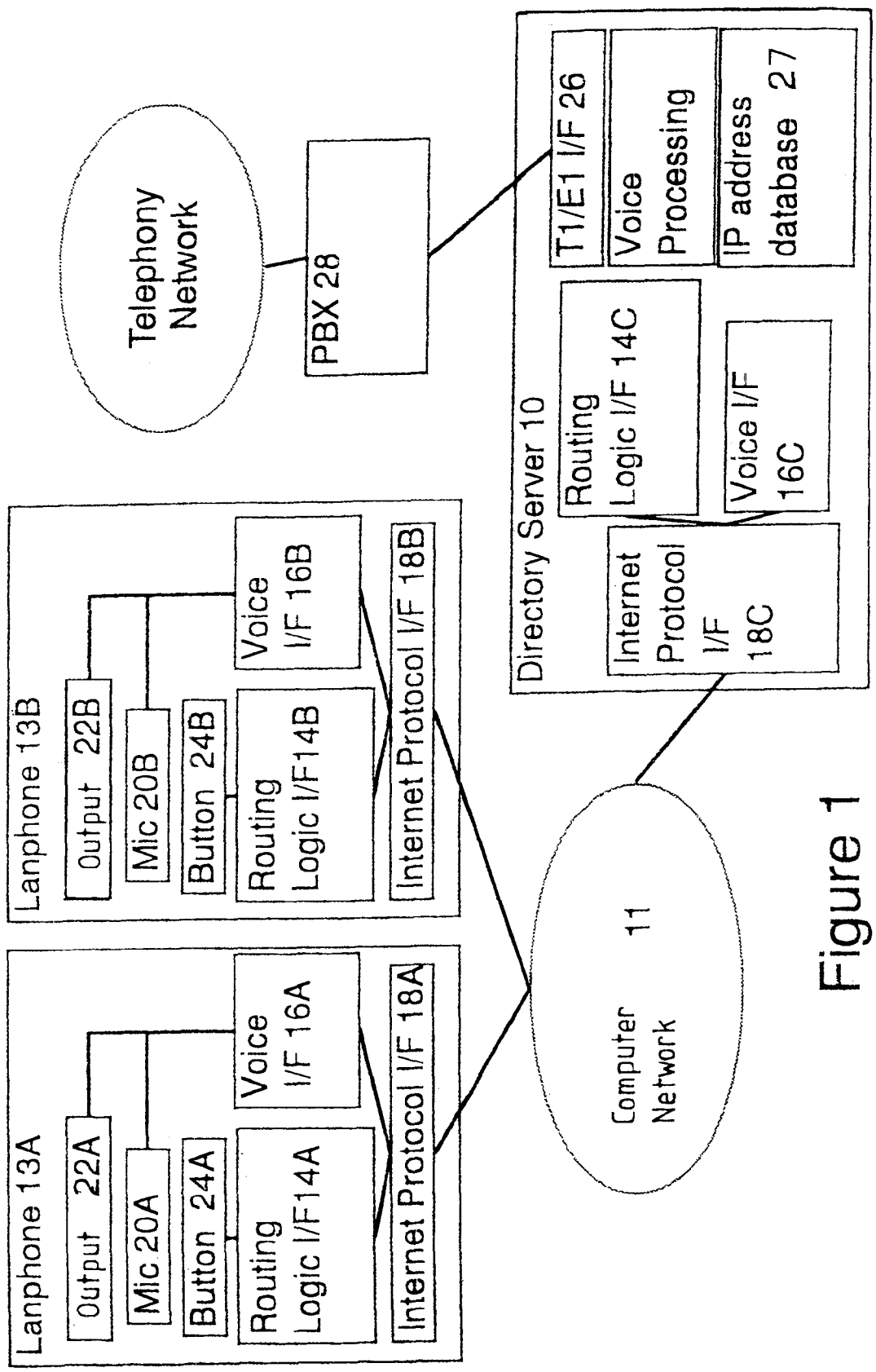
FIG. 1 is a schematic representation of two computer network telephones connected by a computer network.

The embodiment comprises a first and second network telephone 13A,B connected to the server 10 via a computer network 11 (see FIG. 1). The preferred network is the INTERNET but the network can be a wide area network or a local area network. The server 10 is connected to the INTERNET via a network adapter or via an INTERNET gateway, for example in another server on the LAN In the embodiment the first and second network telephones 13A,B are connected independently to the INTERNET.

A personal computer set up as a network telephone typically has a microprocessor, semiconductor memory (ROM/RAM), hard disk, and a bus over which data is transferred (not shown). Other components of the computer are a display, keyboard and mouse (not shown). The computer maybe any conventional workstation, such as an Aptiva computer, available from IBM Corporation. Alternatively, any other form of suitable network access device, including the new generation of low-cost systems ('network computers' or 'thin clients'—effectively sub-PCs) which are currently being developed, maybe employed as the client telephone terminal.

Each network telephone is equipped with a network adapter card and accompanying software including a routing logic interface 14A,B, voice over ip interface 16A,B and INTERNET protocol interface 18A,B. The network adapter provides the hardware layer interface directly to the LAN or INTERNET gateway. Alternatively the INTERNET is accessed using a modem via an INTERNET provider. The operation of a network adapter card or modem to provide INTERNET access is well-known, and so will not be described in detail. The routing logic module 14 provides the mechanism to select the server and other network telephones to receive INTERNET messages. The voice over ip interface 16A,B provides the mechanism to convert voice signals to and from INTERNET messages. The INTERNET protocol module provides the mechanism to set up INTERNET connections between the server and the network phone to send INTERNET messages via the connections. Button 24A,B is linked to the routing logic interface 14A,B. On activation of the button 24A, an INTERNET message is sent between the routing logic module 14A and the directory server 10.

An audio card (not shown), for example MWAVE™ Audio card from IBM Corporation, is connected to the bus and to a headset including microphone 20A,B and earphone 22A,B for audio input and output respectively. Alternatively the network phone may have a loudspeaker, and built-in microphone, but the use of a headset is preferred to optimise the quality of the audio signal produced and actually heard.

The network server 10 is based on a conventional computer work station having a display screen, keyboard, microprocessor, ROM/RAM, disk storage (not shown). The RISC system/6000 workstation, available from the IBM Corporation, is an example. The network server 10 is connected to the INTERNET via routing logic module 14C, voice over IP interface module 16C and internet protocol interface 18C. The server 10 comprises voice processing functionality 25 and a IP address database 27.

Figure 2:
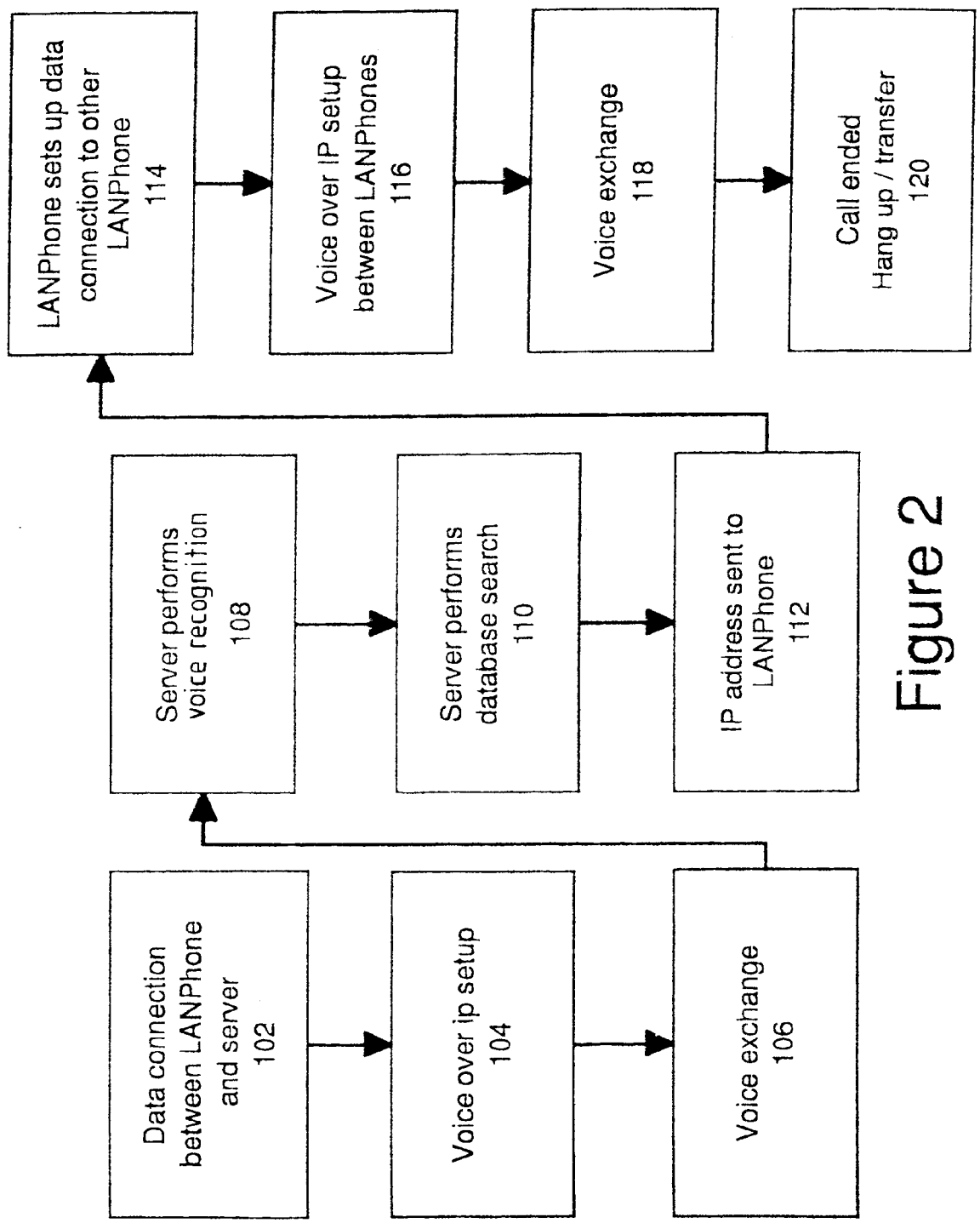
FIG. 2 shows the method used to connect the network telephones.

The network phone 13A requires routing information from the directory server 10. When the button 13A is depressed a data message is sent (step 102—see FIG. 2) to check the server 10 is ready The ip address of the directory server is permanently stored in network phone 13A memory and selected by the routing logic interface 14A so that the IP interface 18A can set up the data channel. Once it is established that the directory server 10 is ready the voice-over ip interface can set up voice channels between the speaker 22A and microphone 20A of the network phone and me directory server 10 (step 104). The caller speaks the name of the recipient intended for the call, i.e. the user of network phone 13B (step 106). The directory server 10 performs speech recognition on the callers voice to determine the destination of the call (step 108). The server 10 then looks up the address of the recipient (step 110) and passes the address back to phone 13 along the data channel (step 112).

Network phone 13A first "pings" network phone 13B to check that it is available (step 114), the "ping" is to check that network phone 13B is not already on a call and then connecting to network phone 13B via Voice-over IP (step 116). Network phone 13B rings, and the user of network 13B can accept the call by pressing the button on network phone 13B. The respective users may now have a communication over network phones 13A,B as per a normal POTS call (step 118). In last step (step 120) the connection is hung up when the call is ended.

Another situation arises when network phone 13A (or B) makes another request to the Directory Server 10 such as a transfer to another phone—"transfer [name of user of network phone 13B] to [another users name]". This would temporarily leave phone 13B "waiting" for the reconnection of phone 1 (or another user), or the Directory Server if a transfer is to be made to Phones outside the network. If the request is "hang up" (or some shorthand agreed for this such as "ok") then phone 1 is instructed by the Directory Server to send a packet of data to LAN Phone 2 telling it that it has hung up.

The Directory Server has a T1/E1 interface 26 to a PBX 28 which is connected to other telephone switches via a POTS telephony network. This allows network phone users to talk to ordinary telephones using the Directory Server as a Voice-over IP Gateway (the users on ordinary telephones could be referred to by their names if the Directory Server was aware of them, or by their names and telephone numbers if this was the first call to their numbers).

Although the embodiment has been described in terms of the network phone controlling the routing of the connection from the first phone to the second phone, it has been envisaged that the directory server can act as a node in the connection of the first phone to the second phone. In this case the server opens a second channel to the second network phone after the ip address has been located and then connects the first network phone channel with the second network phone channel.

Now that the invention has been described by way of a preferred embodiment, various modifications and improvements will occur to those person skilled in the art. Therefore it should be understood that the preferred embodiment has been provided as an example and not as a limitation.

What is claimed is:

1. A method of connecting computer network ip telephones:

opening a voice channel from one of said ip phones to a speech reconition server on activation of said one ip phone;

determining a name from a speech input sent over the voice channel to speech recognition server;

determining an ip address from an ip address database corresponding to the determined name;

opening a data channel from the database and transmitting the ip address to one or other of said telephones; and routing logic on said one or other ip phones using the ip address to establish a connection with the other ip phone.

2. A method as claimed in claim 1, whereby the ip phone is activated when the phone is taken off the hook.

3. A computer network telephone comprising:

speech recognition functionality wherein a voice channel is opened to said speech recognition functionality on activation of said computer network telephone;

a network address database functionality having a plurality of ip address, each ip address having an assocaited name; and a routing logic module;

wherein the speech recognition functionality determines a name from a spoken name, an ip address is determined from the network address database using the determined name, and the routing logic module uses the determined ip address to establish a connection with another network telephone at the determined ip address.

4. A computer network telephone as claimed in claim 3 wherein the routing logic module is an integral part of the network telephone and allows the ip phone to route calls directly to other ip phones give their ip address.

5. A computer network telephone as claimed in claim 3 wherein the speech recognition engine is provided in a remote server and also the ip address database maybe provided in a remote server.

6. A computer network telephone as claimed in claim 5 wherein the ip address database and the speech recognition functionality are provided in the same remote server.

7. A computer network telephony server comprising:

speech recognition functionality;

means for opening a voice channel from a first ip phone to the speech recognition functionality on activation of said first ip phone;

network address database functionality having a plurality of ip address, each ip address having an associated name; and routing logic module;

wherein the speech recognition functionality determines a name from a spoken name sent to the server from the ip telephone, an ip address for a second network phone will be determined from the network address database using the determined name, and routing logic will use the determined ip address to establish a connection between the first ip phone and a second ip phone at the determined ip address.

* * * * *